(12) United States Patent
Garg

(10) Patent No.: US 11,145,064 B2
(45) Date of Patent: Oct. 12, 2021

(54) TECHNOLOGIES FOR DETECTING CROP MARKS IN ELECTRONIC DOCUMENTS

(71) Applicant: CIMPRESS SCHWEIZ GMBH, Winterthur (CH)

(72) Inventor: Anshul Garg, Bangalore (IN)

(73) Assignee: CIMPRESS SCHWEIZ GMBH, Winterthur (CH)

( * ) Notice: Subject to any disclaimer, the term of this patent is extended or adjusted under 35 U.S.C. 154(b) by 0 days.

(21) Appl. No.: 17/104,581

(22) Filed: Nov. 25, 2020

(65) Prior Publication Data
US 2021/0158532 A1 May 27, 2021

Related U.S. Application Data

(60) Provisional application No. 62/941,094, filed on Nov. 27, 2019.

(51) Int. Cl.
| | | |
|---|---|---|
| *G06K 9/00* | (2006.01) | |
| *G06K 9/20* | (2006.01) | |
| *G06K 9/46* | (2006.01) | |
| *G06T 7/13* | (2017.01) | |
| *G06T 7/90* | (2017.01) | |
| *G06T 7/00* | (2017.01) | |
| *G06T 11/60* | (2006.01) | |

(52) U.S. Cl.
CPC .............. *G06T 7/13* (2017.01); *G06T 7/0006* (2013.01); *G06T 7/90* (2017.01); *G06T 11/60* (2013.01); *G06T 2207/30144* (2013.01)

(58) Field of Classification Search
CPC ............. G06K 9/00442; G06K 9/2063; G06K 9/4604; G06T 7/0006; G06T 7/13; G06T 7/90; G06T 11/60; G06T 2207/30144
See application file for complete search history.

(56) References Cited

U.S. PATENT DOCUMENTS

| | | |
|---|---|---|
| 9,524,445 B2 | 12/2016 | Campbell |
| 2005/0036708 A1* | 2/2005 | Boll .................... H04N 1/00352 |
| | | 382/283 |

(Continued)

FOREIGN PATENT DOCUMENTS

CN 108345881 A 7/2018

OTHER PUBLICATIONS

International Application No. PCT/IB2020/061152, International Search Report and Written Opinion, dated Feb. 17, 2021.

*Primary Examiner* — Yubin Hung
(74) *Attorney, Agent, or Firm* — Marshall, Gerstein & Borun LLP

(57) ABSTRACT

Systems and methods for detecting crop marks depicted in digital images are disclosed. According to certain aspects, an electronic device may, in conjunction with enabling a user to customize a product design, facilitate a set of digital image processing functionalities to detect a set of crop marks depicted in a digital image associated with the product design. In particular, the systems and methods may detect a first set of lines depicted in a processed digital image indicative of content of interest extracted from the digital image, and detect a second set of lines depicted in a subtracted digital resulting from subtracting a set of contours from the processed digital image. The systems and methods may determine the set of crop marks from the first and second sets of lines.

20 Claims, 15 Drawing Sheets

(56) References Cited

U.S. PATENT DOCUMENTS

| | | | |
|---|---|---|---|
| 2005/0083556 A1* | 4/2005 | Carlson | H04N 1/00811 358/474 |
| 2007/0116350 A1* | 5/2007 | Cheverton | G06T 7/33 382/151 |
| 2007/0158427 A1* | 7/2007 | Zhu | G06K 7/14 235/462.45 |
| 2011/0102817 A1* | 5/2011 | Hoover | H04N 1/3878 358/1.9 |
| 2011/0292449 A1* | 12/2011 | Tan | H04N 1/00708 358/1.18 |
| 2012/0200885 A1* | 8/2012 | Matsuzawa | B41J 11/663 358/1.15 |
| 2014/0136962 A1* | 5/2014 | Fischer | H04N 1/3872 715/250 |
| 2016/0044197 A1* | 2/2016 | Kang | H04N 1/00801 358/538 |
| 2018/0021969 A1* | 1/2018 | Fujita | B26D 5/26 83/286 |
| 2018/0373950 A1* | 12/2018 | Gong | G06T 7/11 |
| 2019/0335064 A1* | 10/2019 | Nakamura | H04N 1/00045 |

* cited by examiner

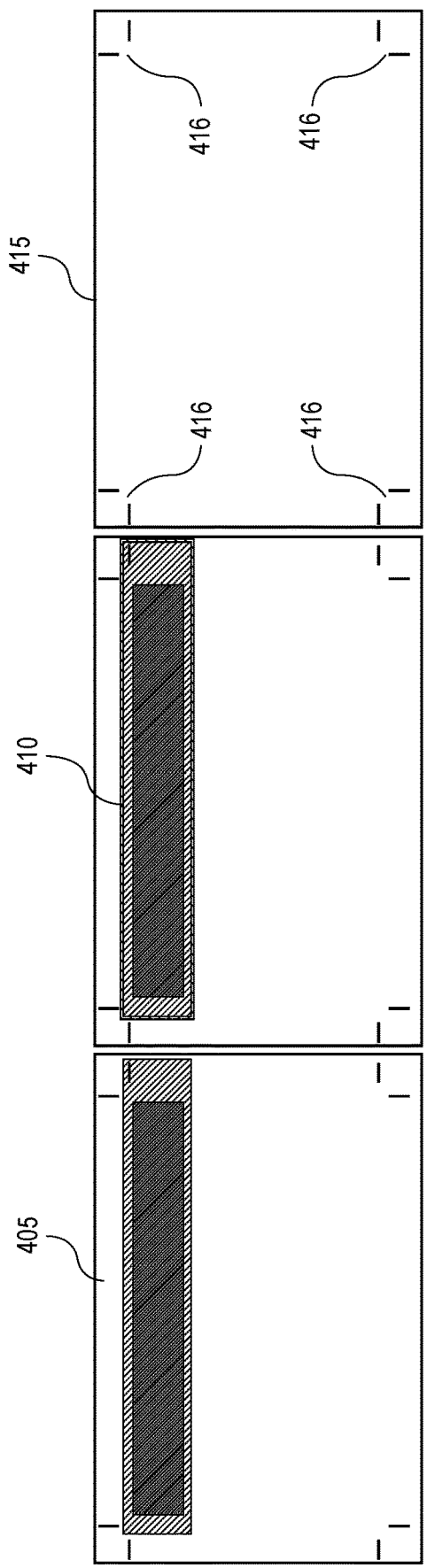

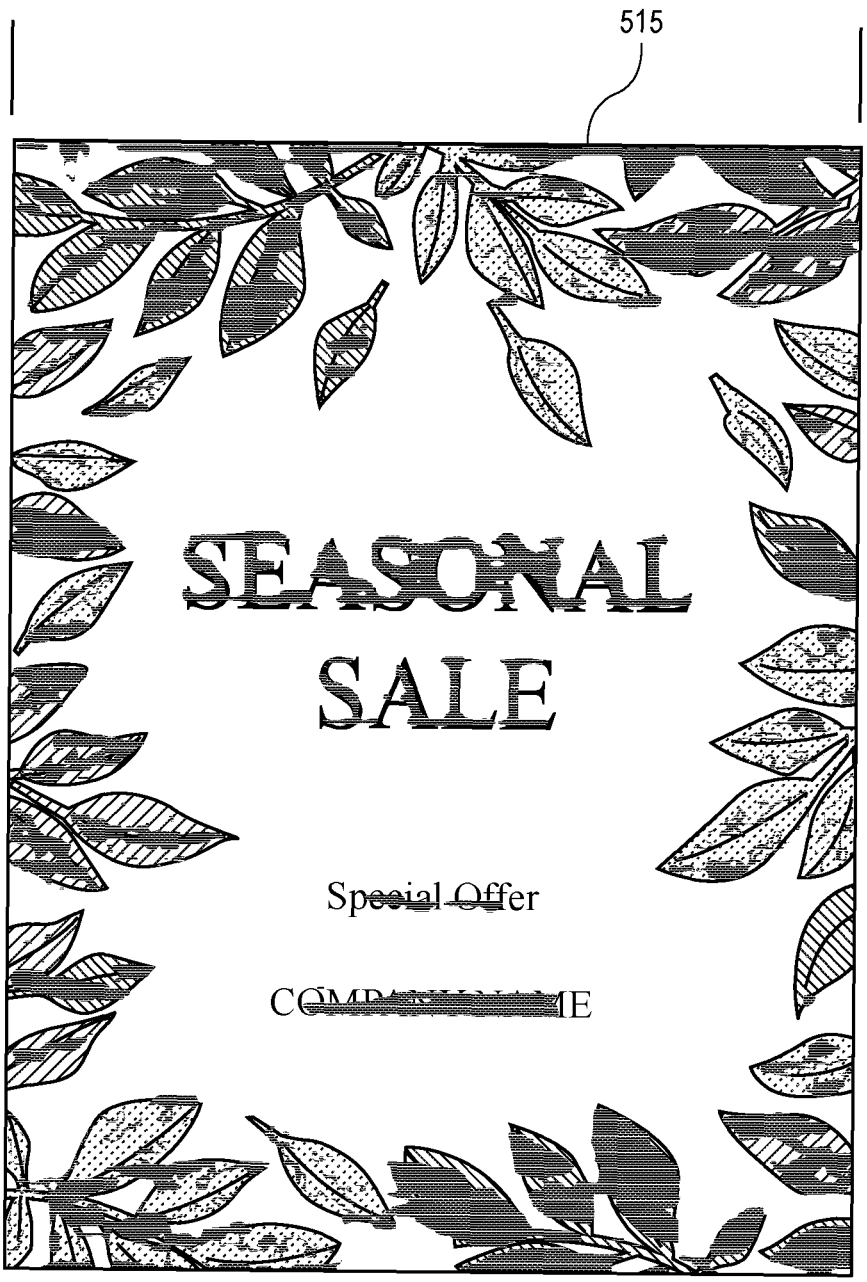
HIGHLIGHTING ONLY HORIZONTAL EDGES
FIG. 5C

TECHNOLOGIES FOR DETECTING CROP MARKS IN ELECTRONIC DOCUMENTS

CROSS-REFERENCE TO RELATED APPLICATIONS

This application claims priority to U.S. Patent Application No. 62/941,094, filed Nov. 27, 2019, the disclosure of which is hereby incorporated by reference in its entirety.

FIELD

The present disclosure is directed to improvements related to product customization. More particularly, the present disclosure is directed to platforms and technologies for reducing undesirable features or errors associated with production of products having visible crop marks.

BACKGROUND

Individuals or customers frequently purchase or order products or items for certain applications or uses. For example, an individual may order customized printed products such as brochures and business cards associated with a business. Conventionally, individuals may use online design studios to customize the designs to be applied to certain products. These online design studios typically enable the individuals to modify or adjust the designs prior to the products being produced or printed.

Typically, electronic documents associated with digital designs may include crop marks, which are lines included near the corners of an electronic document to indicate where the printer (or production machine) is to trim the substrate during product printing. However, crop marks are not considered part of the content of the design to be printed, and it is therefore undesirable to have crop marks printed on a finished product. When a user uploads an electronic document that already includes crop marks, the system is tasked with locating the crop marks to avoid the crop marks being printed on the finished products, which uses resources. Existing techniques for detecting crop marks use certain metadata (e.g., that embedded in PDF files), however these techniques are limited especially in situations in which the metadata is missing or incomplete, or where the techniques attempt to detect the crop marks directly from the electronic documents (e.g., directly from images).

Thus, there is an opportunity for systems and methods to effectively and efficiently detect crop marks included in electronic documents to reduce or eliminate crop mark-related errors in producing products.

SUMMARY

In an embodiment, a computer-implemented method of detecting a set of crop marks in a digital image depicting a visual design is provided. The method may include: extracting, by a computer processor from the digital image, content of interest that includes at least the visual design, resulting in a processed digital image; detecting, by the computer processor from the processed digital image, a set of contours exclusive of the set of crop marks; subtracting the set of contours from the processed digital image, resulting in a subtracted digital image; detecting, by the computer processor, (i) a first set of lines depicted in the processed digital image, and (ii) a second set of lines depicted in the subtracted digital image; and determining, from the first set of lines and the second set of lines, the set of crop marks.

In another embodiment, a system for detecting a set of crop marks in a digital image depicting a visual design is provided. The system may include a memory storing a set of computer-readable instructions, and a processor interfacing with the memory. The processor may be configured to execute the set of computer-readable instructions to cause the processor to: extract, from the digital image, content of interest that includes at least the visual design, resulting in a processed digital image, detect, from the processed digital image, a set of contours exclusive of the set of crop marks, subtract the set of contours from the processed digital image, resulting in a subtracted digital image, detect (i) a first set of lines depicted in the processed digital image, and (ii) a second set of lines depicted in the subtracted digital image, and determine, from the first set of lines and the second set of lines, the set of crop marks.

Further, in an embodiment, a non-transitory computer-readable storage medium for detecting a set of crop marks in a digital image depicting a visual design is provided. The non-transitory computer-readable storage medium has stored thereon a set of instructions, executable by at least one processor, and comprising: instructions for extracting, from the digital image, content of interest that includes at least the visual design, resulting in a processed digital image; instructions for detecting, from the processed digital image, a set of contours exclusive of the set of crop marks; instructions for subtracting the set of contours from the processed digital image, resulting in a subtracted digital image; instructions for detecting (i) a first set of lines depicted in the processed digital image, and (ii) a second set of lines depicted in the subtracted digital image; and instructions for determining, from the first set of lines and the second set of lines, the set of crop marks.

BRIEF DESCRIPTION OF THE FIGURES

FIGS. 4A-4C illustrate an example image that undergoes contour detection, in accordance with some embodiments.

FIGS. 5A-5E illustrate an example image after various stages of processing, in accordance with some embodiments.

DETAILED DESCRIPTION

The present embodiments may relate to, inter alia, platforms and technologies for detecting crop marks within digital images. According to certain aspects, the systems and methods may incorporate various digital image processing techniques to detect the crop marks. In particular, the systems and methods may incorporate the following techniques or functionalities individually and in combination: image preprocessing in which content of interest (e.g., vertical and horizontal images) is extracted from digital images; noise reduction in which contour detection is used to remove objects or structure present in an image other than crop marks; pairing intersections which form the geometry of potential crop marks; and detecting crop marks which are present in sets of fours and satisfy a condition of relativity.

The systems and methods offer numerous benefits. In particular, the image processing techniques effectively and efficiently detect crop marks within digital images, or otherwise in electronic documents in which crop mark information is not embedded within document metadata. The systems and methods remove the crop marks from the digital images, thus preventing them from being printed on the finished products. This results in fewer production errors and fewer customer complaints. Because of the reduction in production errors, platforms that offer customized product production may realize reduced costs, greater profits, and increased sales. It should be appreciated that additional benefits are envisioned.

The systems and methods discussed herein improve the functioning of a computer as well as virtual design platforms. Conventionally, crop mark parameters are embedded within metadata of an electronic document (e.g., a PDF file). However, techniques for detecting crop marks in a design are limited or non-existent when the crop mark parameters are not embedded within an electronic document, for example if crop marks are depicted in a digital image. As a result, the crop marks that are not meant to be printed may end up being printed on a finished product. The systems and methods are an improvement to how computers process electronic images because the systems and methods automatically and dynamically detect crop marks and distinguish the crop marks from the visual content of underlying designs. In doing so, the systems and methods may apply various image processing techniques that accurately detect crop marks with limited or no instances of missed detections and false positives.

Figure 1A:
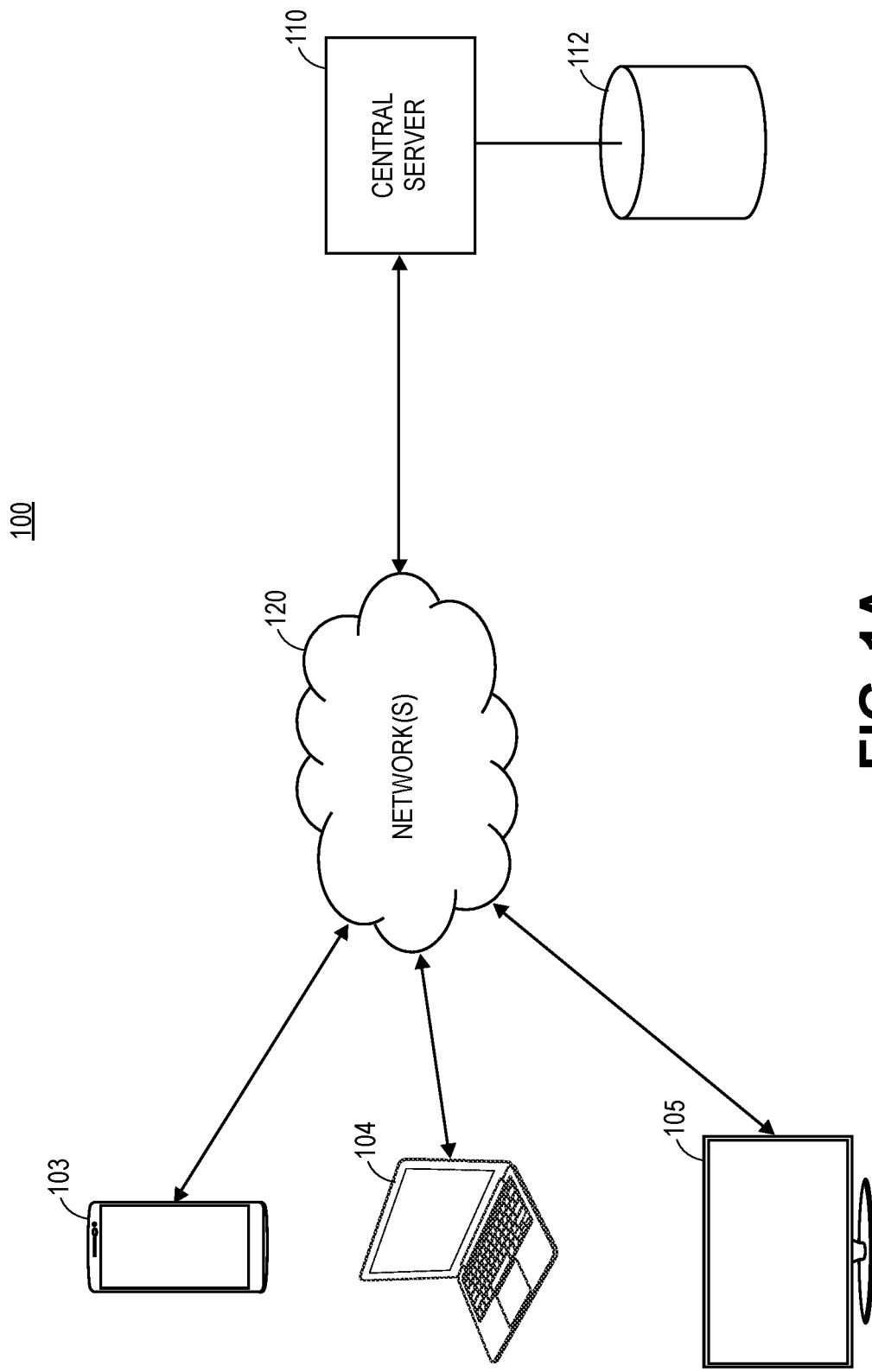
FIG. 1A depicts an overview of components and entities associated with the systems and methods, in accordance with some embodiments.

FIG. 1A illustrates an overview of a system 100 of components configured to facilitate the systems and methods. It should be appreciated that the system 100 is merely an example and that alternative or additional components are envisioned.

As illustrated in FIG. 1A, the system 100 may include a set of electronic devices 103, 104, 105 which may be used or operated by a set of users, such as any individual or person who may be interested in purchasing items, products, and/or services that may be offered for sale by an entity. In an embodiment, the entity may be a corporation, company, partnership, retailer, wholesaler operating on behalf of another entity (e.g., a white label wholesaler), or the like, where the entity may offer an e-commerce platform (e.g., a website accessible by or an application executable by the electronic devices 103, 104 105) and optionally a set of brick-and-mortal retail stores. Each of the electronic devices 103, 104, 105 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like.

The electronic devices 103, 104 105 may communicate with a central server 110 via one or more networks 120. The central server 110 may be associated with the entity that owns and/or manages the e-commerce platform(s) and/or the set of brick-and-mortal retail stores. In particular, the central server 110 may include or support a web server configured to host a website that offers various products and/or services for purchase by users. Further, the central server 110 may support a software application executable by the set of electronic devices 103, 104, 105 (i.e., the set of electronic devices 103, 104, 105 may interface with the central server 110 in executing the software application). In embodiments, the network(s) 120 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others).

Although depicted as a single central server 110 in FIG. 1A, it should be appreciated that the server 110 may be in the form of a distributed cluster of computers, servers, machines, or the like. In this implementation, the entity may utilize the distributed server(s) 110 as part of an on-demand cloud computing platform. Accordingly, when the electronic devices 103, 104, 105 interface with the server 110, the electronic devices 103, 104, 105 may actually interface with one or more of a number of distributed computers, servers, machines, or the like, to facilitate the described functionalities.

The central server 110 may be configured to interface with or support a memory or storage 112 capable of storing various data, such as in one or more databases or other forms of storage. According to embodiments, the storage 112 may store data or information associated with products or services that are offered for sale by the entity that owns and/or manages the e-commerce platform and/or the set of brick-and-mortal retail stores. For example, the storage 112 may store information associated with office supplies such as business cards and notepads, including information associated with a customer or client (e.g., company name and logo). For further example, the storage 112 may store templates of designs, as well as information associated with the designs, including properties and dimensions of the elements/components of the designs.

Although three (3) electronic devices 103, 104, 105, and one (1) server 110 are depicted in FIG. 1A, it should be appreciated that greater or fewer amounts are envisioned. For example, there may be multiple central servers, each one associated with a different entity. Additionally, the electronic devices 103, 104, 105 and the central server 110 may interface with one or more separate, third-party servers (not depicted in FIG. 1A) to retrieve relevant data and information.

Figure 1B:
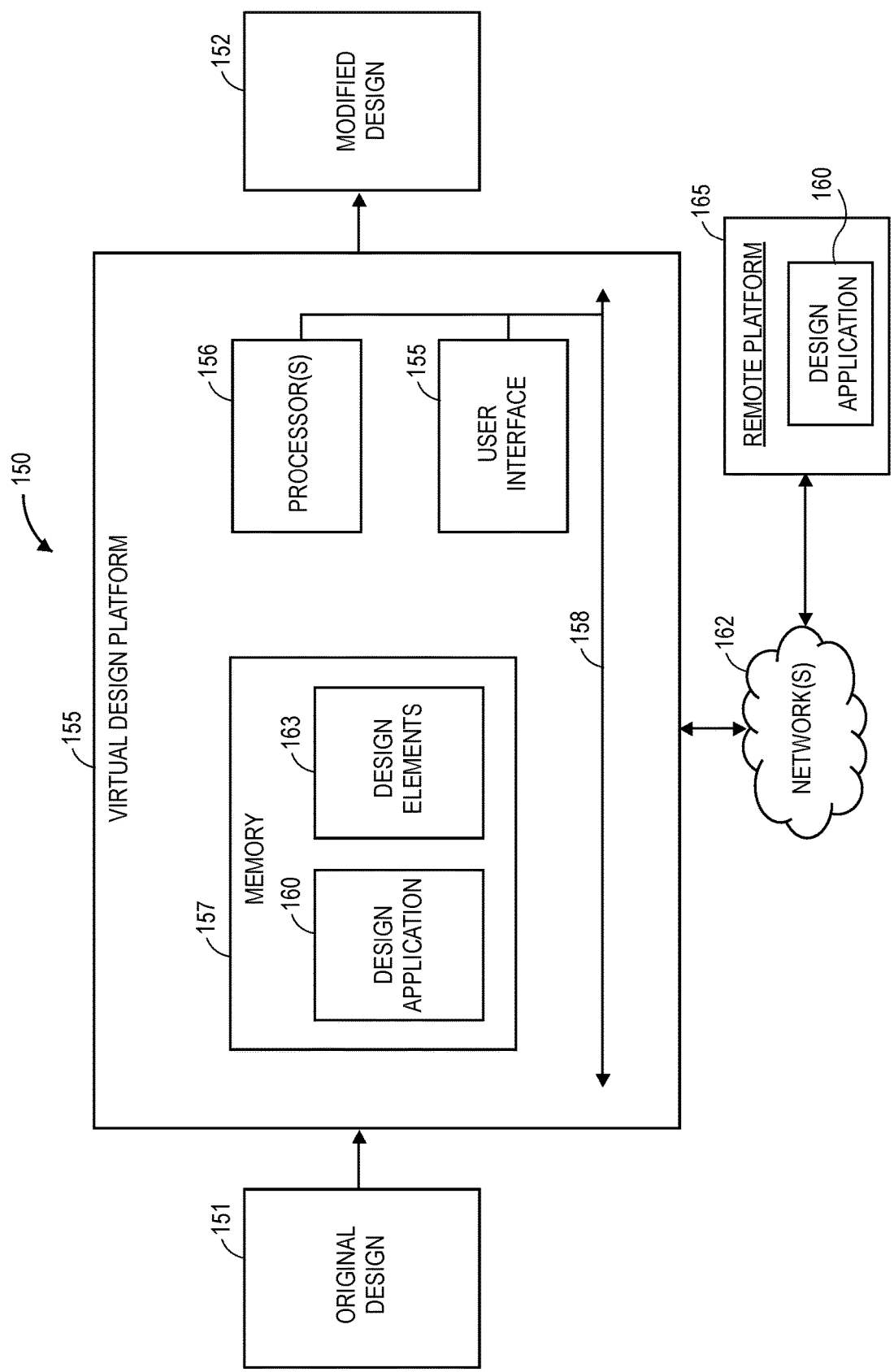
FIG. 1B depicts an overview of certain components configured to facilitate the systems and methods, in accordance with some embodiments.

According to embodiments, users of the electronic devices 103, 104, 105 may select a design(s) of an item to preview and modify using the electronic devices 103, 104, 105, such as in contemplation of placing an order for the item(s). The design(s) may include at least one digital image in various file formats (e.g., JPEG, TIFF, GIF, PNG, Raw, etc.), where the digital image(s) may depict visual content (i.e., the design itself) that may be composed of one or more design elements. The users may use the respective electronic devices 103, 104, 105 to modify certain of the design elements. Prior to the design(s) being produced into finished products, the electronic devices 103, 104, 105 may facilitate or perform various image processing techniques on the digital image(s) to detect and remove crop marks which may be depicted in the digital image(s). FIG. 1B depicts more specific components associated with the systems and methods.

FIG. 1B an example environment 150 in which an original design 151 is processed into a modified design 152 via a virtual design platform 155, according to embodiments. The virtual design platform 155 may be implemented on any computing device, including one or more of the electronic devices 103, 104, 105 or the server 110 as discussed with respect to FIG. 1A. Components of the computing device may include, but are not limited to, a processing unit (e.g., processor(s) 156), a system memory (e.g., memory 157), and a system bus 158 that couples various system components including the memory 157 to the processor(s) 156. In some embodiments, the processor(s) 156 may include one or more parallel processing units capable of processing data in parallel with one another. The system bus 158 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The virtual design platform 155 may further include a user interface 153 configured to present content (e.g., designs and components/elements thereof). Additionally, a user may make selections to the content via the user interface 153, such as to modify designs (or design elements thereof) presented thereon. The user interface 153 may be embodied as part of a touchscreen configured to sense touch interactions and gestures by the user. Although not shown, other system components communicatively coupled to the system bus 158 may include input devices such as cursor control device (e.g., a mouse, trackball, touch pad, etc.) and keyboard (not shown). A monitor or other type of display device may also be connected to the system bus 158 via an interface, such as a video interface. In addition to the monitor, computers may also include other peripheral output devices such as a printer, which may be connected through an output peripheral interface (not shown).

The memory 157 may include a variety of computer-readable media. Computer-readable media may be any available media that can be accessed by the computing device and may include both volatile and nonvolatile media, and both removable and non-removable media. By way of non-limiting example, computer-readable media may comprise computer storage media, which may include volatile and nonvolatile, removable and non-removable media implemented in any method or technology for storage of information such as computer-readable instructions, routines, applications (e.g., a design application 160) data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the processor 156 of the computing device.

The virtual design platform 155 may operate in a networked environment and communicate with one or more remote platforms, such as a remote platform 165, via a network 162, such as a local area network (LAN), a wide area network (WAN), or other suitable network. The platform 165 may be implemented on any computing device, including one or more of the electronic devices 103, 104, 105 or the server 110 as discussed with respect to FIG. 1A, and may include many or all of the elements described above with respect to the platform 155. In some embodiments, as will be described herein, the design application 160 as will be further described herein may be stored and executed by the remote platform 165 instead of by or in addition to the platform 155.

According to embodiments, the virtual design platform 155 (and more particularly, the design application 160) may process or modify the original design 151 to produce the modified design 152. It should also be understood that although only one of each of the original design 151 and the modified design 152 is shown, the example environment 150 may be configured to process or modify multiple designs. Each of the original design 151 and the modified design 152 may be embodied as any type of electronic document, file, template, etc., that may include a set of design elements or components, each of which may be some type of displayable content (e.g., a combination of textual and/or visual content).

According to embodiments, the original design 151 may include at least one digital image in various file formats (e.g., JPEG, TIFF, GIF, PNG, Raw, etc.). However, it should be appreciated that other formats for the original design 151 are envisioned (e.g., PDF, DOC, HWP, ODT, PAGES, RTF, etc.). According to embodiments, the design application 160 may execute or facilitate various image processing techniques to detect and remove crop marks that may be depicted in the original design 151. The memory 157 may further store design elements 163 accessible to the design application 160, and the design application 160 may additionally process the original design 151 by modifying, deleting, inserting, and/or replacing certain of the set of design elements, or parameters thereof, included in the original design 151. Each of the design elements included in the original design 151 and in the design elements 163 may have associated metadata that may define how the corresponding design element is to be presented within the original design 151 and/or modified based on a modification(s) to another design element(s). In embodiments, the designs 151, 152, the design elements, and the metadata thereof may be implemented using any type of file format.

Figure 2:
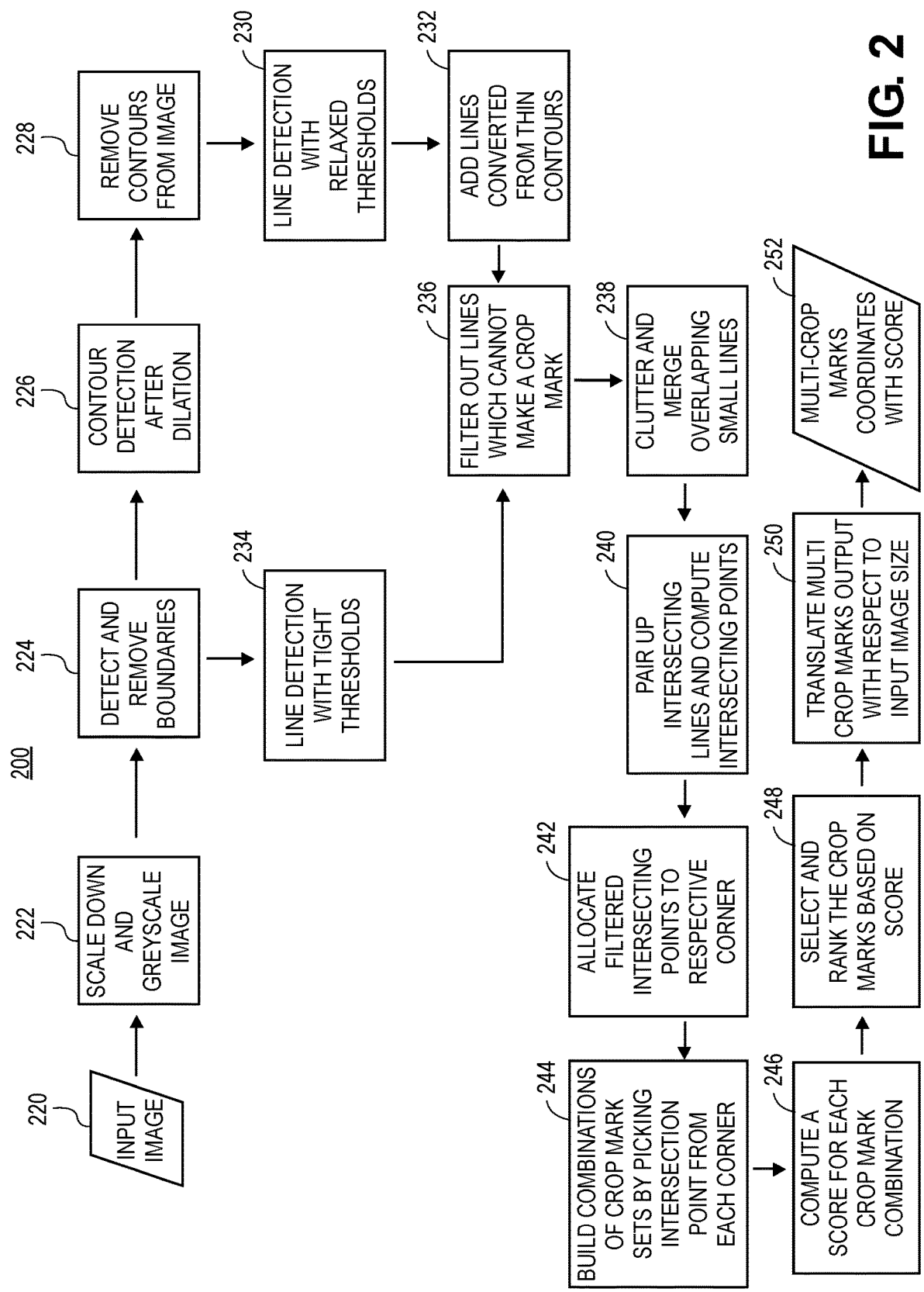
FIG. 2 illustrates various functionalities associated with crop mark detection, in accordance with some embodiments.

FIG. 2 illustrates an example flow 200 associated with the systems and methods. The flow 200 may be implemented on, executed, or facilitated by a computing device and/or components thereof, such as the central server 110 as discussed with respect to FIG. 1A or the virtual design platform 155 as discussed with respect to FIG. 1B.

The flow 200 may include an input image 220 (e.g., a digital image) which the computing device may scale down and greyscale (222). According to aspects, the computing device may resize the image to a standard size while maintaining its aspect ratio. Additionally or alternatively, the computing device may scale down the image size if it is greater than a predefined threshold. For example, if the input image 220 has a size of 5000×5000, the computing device may scale down the size to 1500×1500. In situations in which the size of the input image 220 is less than the predefined threshold, the computing device may determine to not resize the input image 220. After resizing (or determining not to resize) the input image 220, the computing device may convert the input image 220 into a greyscale version.

The computing device may next detect and remove boundaries (224) that may be present around content of the modified input image. By facilitating adaptive pixel learning, any empty area around the image may be removed, thus focusing on crop mark lines as they may be small in size. Additionally, removing extra area increases the relative size of crop mark lines with respect to the entire image. Moreover, the computing device may add a padding or empty space around the image after cropping which may improve line detection, especially if the lines are present in the corners and/or edges of the image.

The computing device may proceed to (226) and/or to (234) based on various factors. At (226), the computing device may detect any contours present in the image other than crop marks, such as based on the shape and structure of any depicted objects. According to embodiments, the computing device may initially smoothen the image with Gaussian filters and then apply dilation and thresholding, where a structure-based contour detection may be performed on the output to detect all contours present in the image. Because the crop marks are already faded or removed by the dilation, the crop marks may not be detected as contours. As a result, there may be contours on at least a portion or all of the shapes other than crop marks. The computing device may remove contours from the image (228). In particular, the computing device may create a mask of the contours and subtract the mask from the image, resulting in an image with crop marks and potentially a set of thin lines.

Figure 3C:
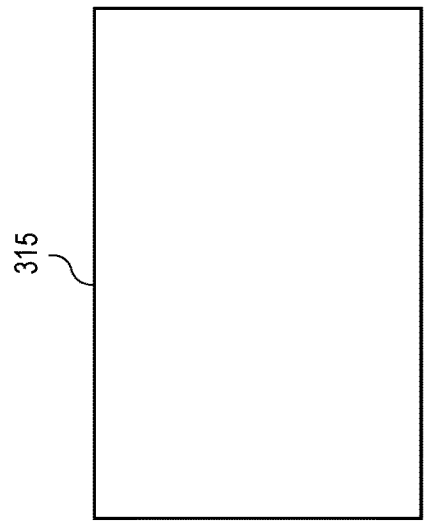
FIGS. 3A-3C illustrate an example input image after various stages of processing, in accordance with some embodiments.
Figure 3B:
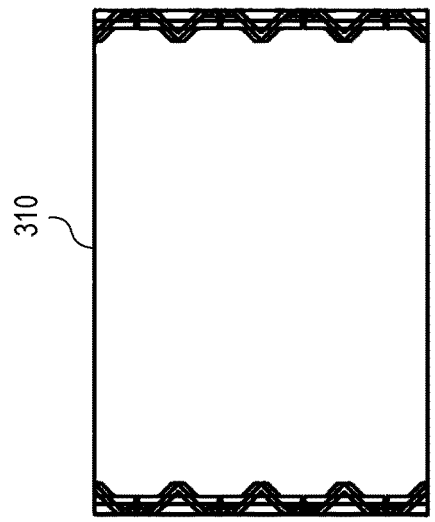
Figure 3A:
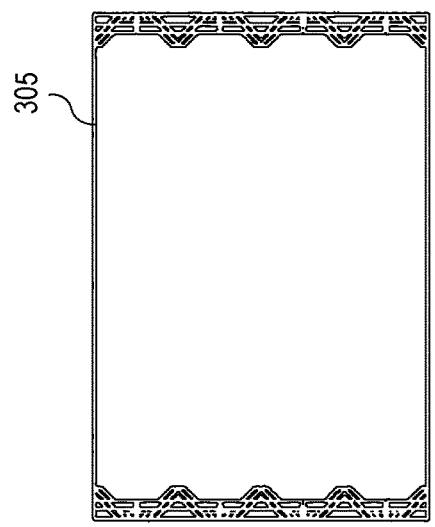

FIGS. 3A-3C illustrate an input image after various stages of processing. In particular, FIG. 3A illustrates an input image 305, FIG. 3B illustrates the image after contour detection (310), and FIG. 3C illustrates the image after contour removal (315).

The computing device may facilitate line detecting according to various thresholds, where the detected lines may represent lines that may be candidates for crop marks. According to embodiments, the computing device may detect lines on both versions of the image (i.e., the image after (224) without contour removal and the image after (228) with contour removal), so as to achieve maximum recall for line detecting (i.e., try to detect all possible lines using an ensemble technique). It may be the case that in removing noise during the contour detection, the computing device may end up removing crop marks as well, and those crop marks will not be detected.

For example, FIGS. 4A-4C illustrate an image that undergoes contour detection. In particular, FIG. 4A depicts an input image 405 that analyzed. FIG. 4B depicts the image with its contours detected (410). FIG. 4C depicts a resulting image 415 without the contours, and depicts crop marks 416 with missing portions. Thus, the computing device may facilitate line detection on the image after (224) with tight thresholds (234) and on the image after noise removing based on contour detection (228) with relaxed thresholds (230), for detecting small lines as well.

To detect lines, the computing device may initially perform a Canny edge detection which may detect all possible edges in the image. Subsequently, the computing device may convolve a Sobel filter on the image to highlight horizontal and vertical lines, and perform a Hough transformation to determine actual coordinates of the lines. In cases in which the Hough transformation fails to detect lines (e.g., lines that are only 3-4 pixels long), the computing device may use the image resulting from the contour detection and add thin detected contours (232), which may look like lines, into the line detection output.

Figure 5A:
Figure 5B:
Figure 5D:
Figure 5E:

FIGS. 5A-5E illustrate various of these features. In particular, FIG. 5A illustrates an input image 505, FIG. 5B illustrates the input image 505 after edge detection (510), FIG. 5C illustrates the input image 505 with horizontal lines highlighted (515), FIG. 5D illustrates the input image 505 with vertical lines highlighted (520), and FIG. 5E illustrates lines detected using the Hough transformation (525).

At (236), the computing device may filter out lines which cannot make a crop mark (i.e., false lines). In particular, the computing device may compute the slope and length of lines from the coordinates and filter out all other angular lines. Additionally, the computing device may remove any long lines, assuming that crop mark lines would be of small length. Further, the computing device may apply filters based on color gradient change where the change of colors in a particular line may be measured. In some embodiments, the computing device may assume that single crop mark lines cannot be of multiple colors, and may remove such lines having multiple colors. The computing device may employ a gradient change filter so as to not constrain to any particular color.

Figure 6B:
FIGS. 6A and 6B illustrate example images resulting from various processing, in accordance with some embodiments.
Figure 6A:
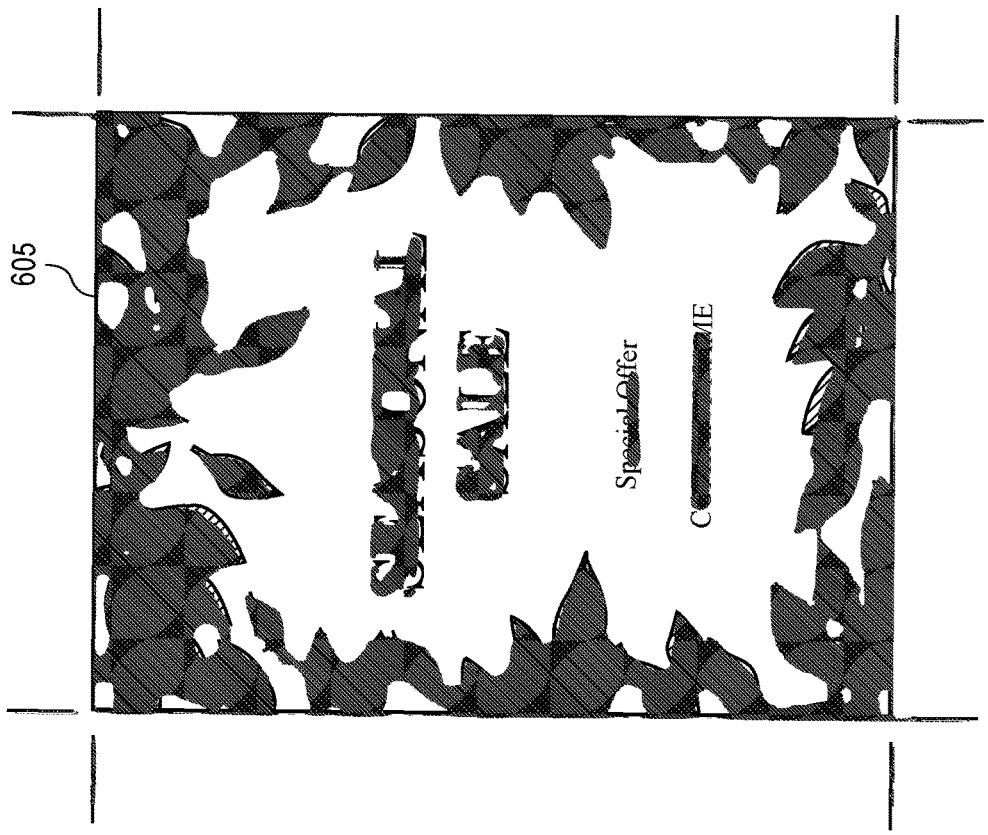

FIGS. 6A and 6B illustrate these features. In particular, FIG. 6A illustrates an image 605 after its lines are detected (i.e., the same illustration as FIG. 5E), and FIG. 6B illustrates an image 610 after removing lines based on various filters.

The computing device may cluster and merge overlapping small lines (238), such as to make one combined line. In some situations, one line may be detected as multiple small overlapping lines, such as when the line is bold. Accordingly, the computing device may perform clustering based on line coordinates in an attempt to merge overlapping lines.

The computing device may pair up (240) intersecting lines and compute intersecting points of the intersecting lines. Additionally, the computing device may filter out pairs of intersecting lines based on their locations and/or directions. In embodiments, crop marks may generally be present in the corner portions(s) of a given image (and may not be generally present in the middle portion of the given image).

Accordingly, the computing device may allocate (242) the filtered intersecting points to a respective corner(s). Additionally, the amount of false positives may be reduced by direction-based intersection removal. That is, the intersecting lines at corners should be facing the correct direction, based on the corner (e.g., top left, bottom left, top right, bottom right).

The computing device may build (244) combinations of crop mark sets by picking an intersection point from each corner. In particular, the computing device may compute intersecting points of nearby lines and treat these intersections as potential crop mark intersections, which may result in a problem of multiple intersecting points per line in cases where more than one crop mark sets are present nearby. For example, there may be four (4) sets of crop marks when there should be two (2) sets of crop marks, because of cross intersections.

Figure 7A:
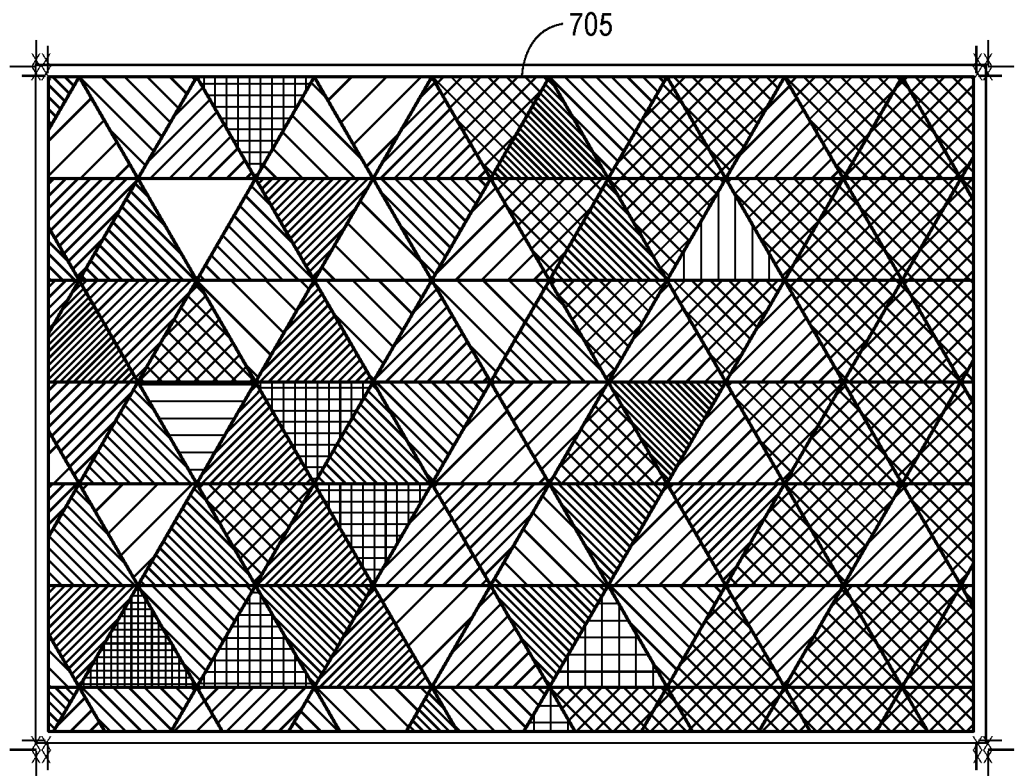
FIGS. 7A and 7B each illustrates an example image depicting crop marks, in accordance with some embodiments.
Figure 7B:
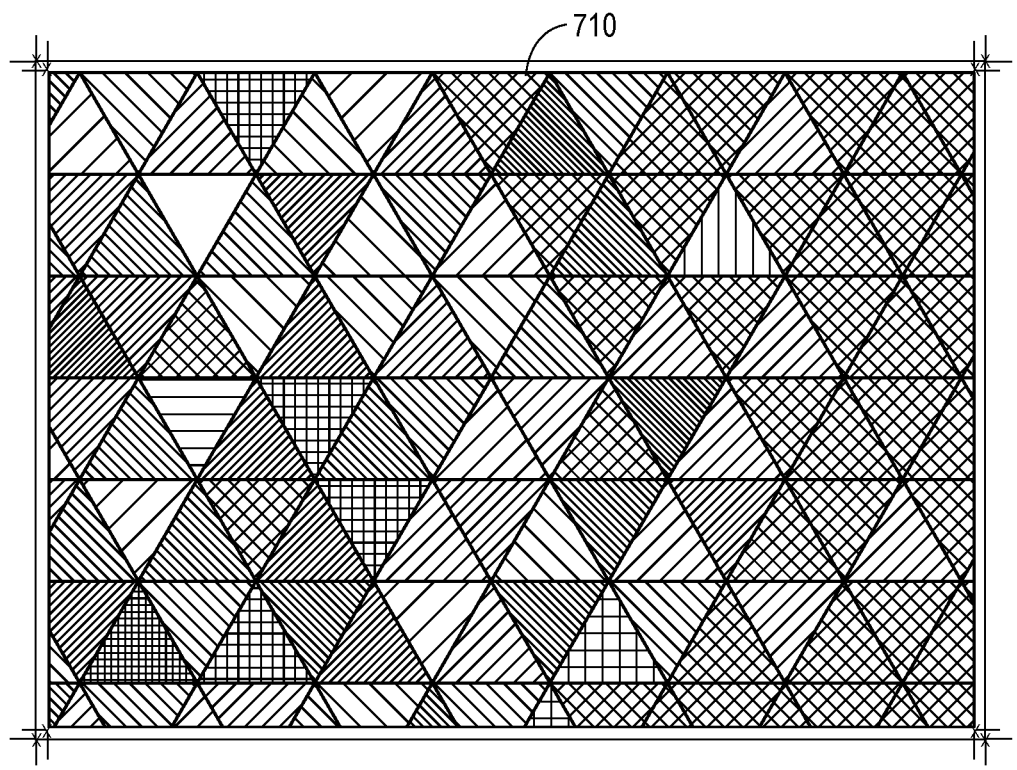

To accommodate, the computing device may apply a logic of single usage, assuming that a line can produce only one intersection point which will be used in making a single crop mark, and that the same line cannot make two sets of crop marks. For example, FIG. 7A illustrates an image 705 in which a combination of four lines has formed four intersection points instead of two. FIG. 7B illustrates an image 710 after assuming single line usage and where a single intersection point per line is selected based on confidence score.

The computing device may compute (246) a score for each crop mark combination. In particular, when the intersection points with the lines with respect to four corners are ascertained, the computing device may create all possible combinations of intersection points, one from each corner, to form respective crop marks sets. The computing device may perform a geometric verification technique to compute a score for each crop marks set, where the score may be based on various factors such as geometric verification, positions relative to each other, gap(s) between lines, length(s) of lines, and area(s) that the marks cover.

The computing device may select (248) and rank the crop marks based on the respective scores, as well as remove false cases if present. Additionally, the computing device may translate (250) crop mark coordinates with respect to input image size. Ultimately, the computing device may generate the final output (252) which may consist of multi-crop marks coordinates with respective scores.

Figure 8:
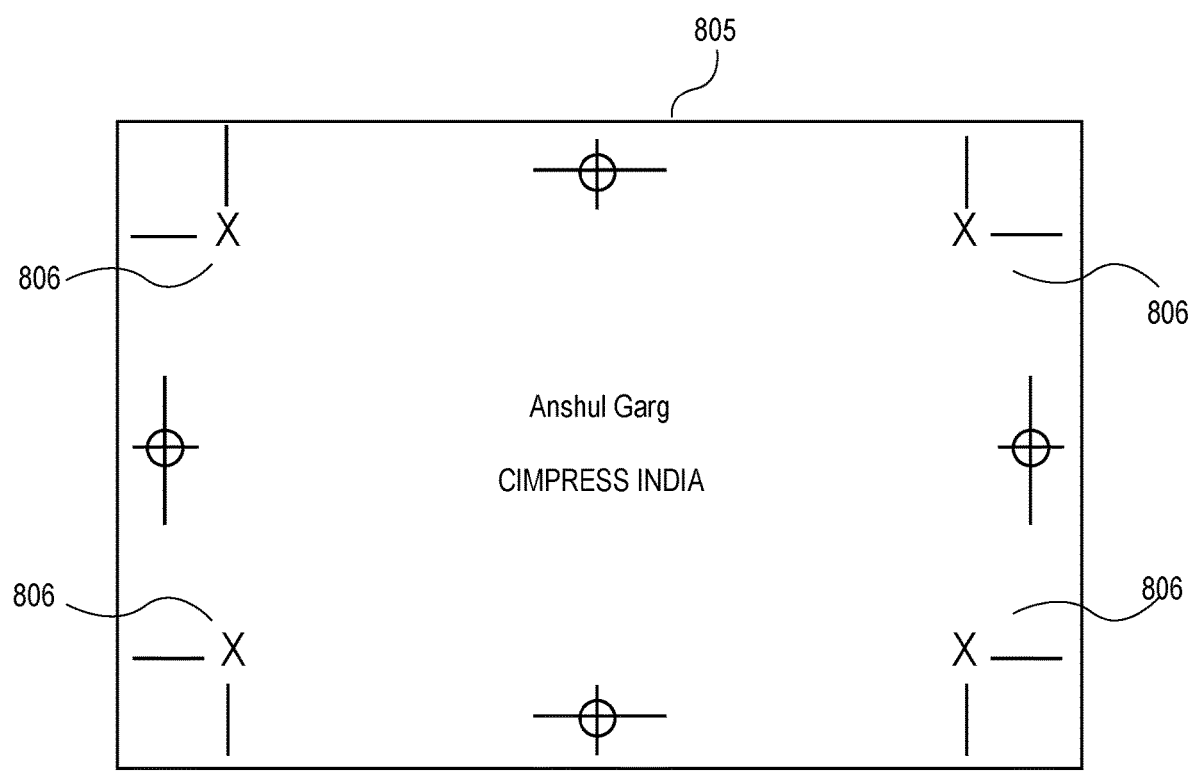
FIG. 8 illustrates an example image after generation of its corresponding final output, in accordance with embodiments.

FIG. 8 illustrates an image 805 after generation of its corresponding final output. As depicted in FIG. 8, the image 805 may include a set of final crop marks 806 based on their respective scores.

Figure 9:
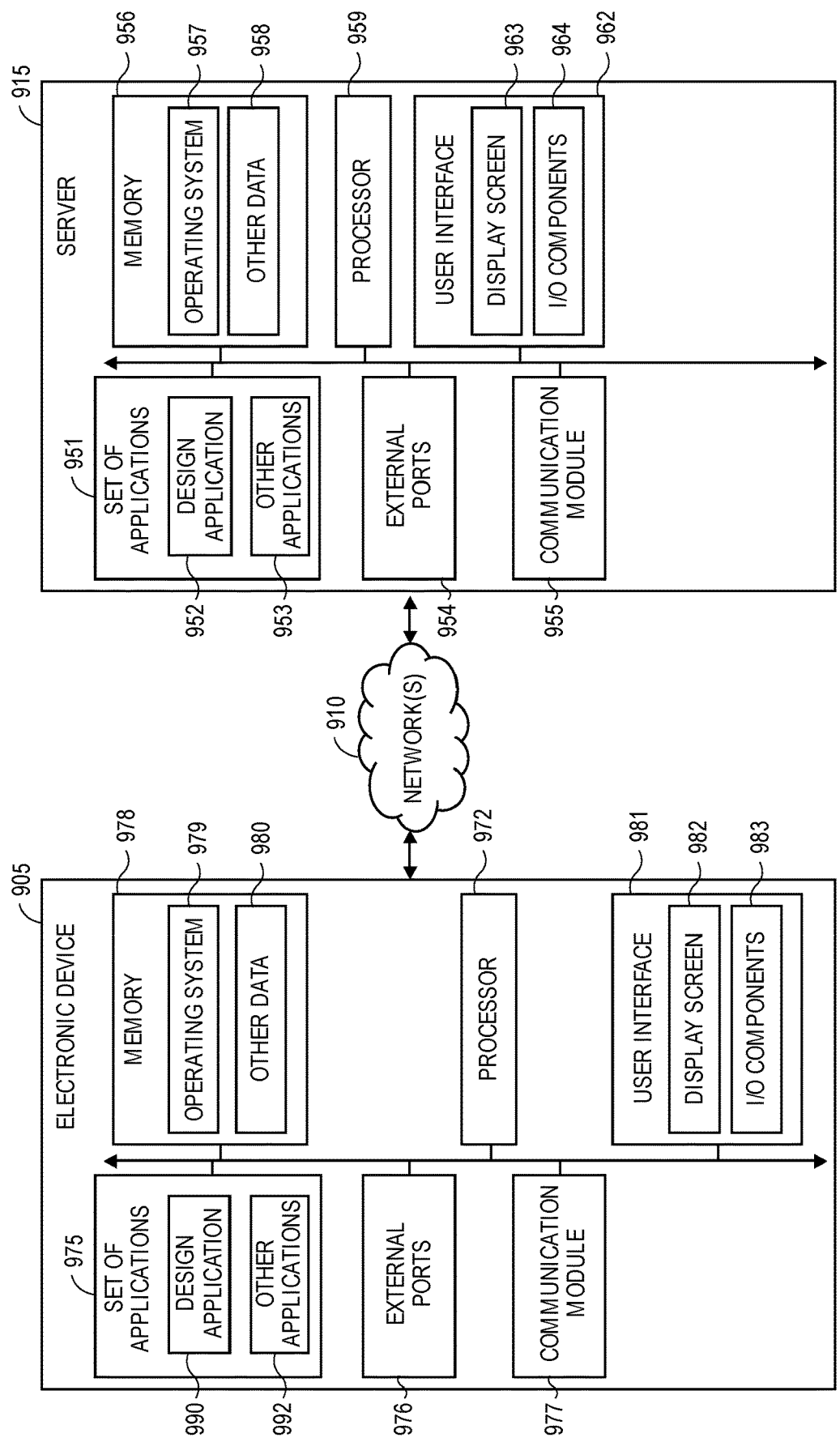
FIG. 9 is a block diagram of an example electronic device and an example server, in accordance with some embodiments.

FIG. 9 illustrates a hardware diagram of an example electronic device 905 (such as one of the electronic devices 103, 104, 105 as discussed with respect to FIG. 1A) and an example server 915 (such as the server computer 110 as discussed with respect to FIG. 1A), in which the functionalities as discussed herein may be implemented.

The electronic device 905 may include a processor 972 as well as a memory 978. The memory 978 may store an operating system 979 capable of facilitating the functionalities as discussed herein as well as a set of applications 975 (i.e., machine readable instructions). For example, one of the set of applications 975 may be a design application 990 configured to facilitate functionalities associated with detecting and removing crop marks depicted in digital images, as discussed herein. It should be appreciated that one or more other applications 992 are envisioned.

The processor 972 may interface with the memory 978 to execute the operating system 979 and the set of applications 975. According to some embodiments, the memory 978 may also include other data 980 including data associated with collected documentation and/or other data. The memory 978 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 905 may further include a communication module 977 configured to communicate data via one or more networks 910. According to some embodiments, the communication module 977 may include one or more transceivers (e.g., WWAN, WLAN, and/or WPAN transceivers) functioning in accordance with IEEE standards, 3GPP standards, or other standards, and configured to receive and transmit data via one or more external ports 976. For example, the communication module 977 may communicate with the server 915 via the network(s) 910.

The electronic device 905 may further include a user interface 981 configured to present information to a user and/or receive inputs from the user. As shown in FIG. 9, the user interface 981 may include a display screen 982 and I/O components 983 (e.g., ports, capacitive or resistive touch sensitive input panels, keys, buttons, lights, LEDs). According to some embodiments, the user may access the electronic device 905 via the user interface 981 to review various designs and preview images, and make various selections.

In some embodiments, the electronic device 905 may perform the functionalities as discussed herein as part of a "cloud" network or may otherwise communicate with other hardware or software components within the cloud to send, retrieve, or otherwise analyze data.

As illustrated in FIG. 9, the electronic device 905 may communicate and interface with the server 915 via the network(s) 910. The server 915 may include a processor 959 as well as a memory 956. The memory 956 may store an operating system 957 capable of facilitating the functionalities as discussed herein as well as a set of applications 951 (i.e., machine readable instructions). For example, one of the set of applications 951 may be a design application 952 configured to facilitate functionalities associated with detecting and removing crop marks depicted in digital images, as discussed herein. It should be appreciated that one or more other applications 953 are envisioned.

The processor 959 may interface with the memory 956 to execute the operating system 957 and the set of applications 951. According to some embodiments, the memory 956 may also include other data 958, such data received from the electronic device 905 and/or other data. The memory 956 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 915 may further include a communication module 955 configured to communicate data via the one or more networks 910. According to some embodiments, the communication module 955 may include one or more transceivers (e.g., WWAN, WLAN, and/or WPAN transceivers) functioning in accordance with IEEE standards, 3GPP standards, or other standards, and configured to receive and transmit data via one or more external ports 954.

The server 915 may further include a user interface 962 configured to present information to a user and/or receive inputs from the user. As shown in FIG. 9, the user interface 962 may include a display screen 963 and I/O components 964 (e.g., ports, capacitive or resistive touch sensitive input panels, keys, buttons, lights, LEDs). According to some embodiments, the user may access the server 915 via the user interface 962 to review information, make selections, and/or perform other functions.

In some embodiments, the server 915 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 972, 959 (e.g., working in connection with the respective operating systems 979, 957) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Figure 10:
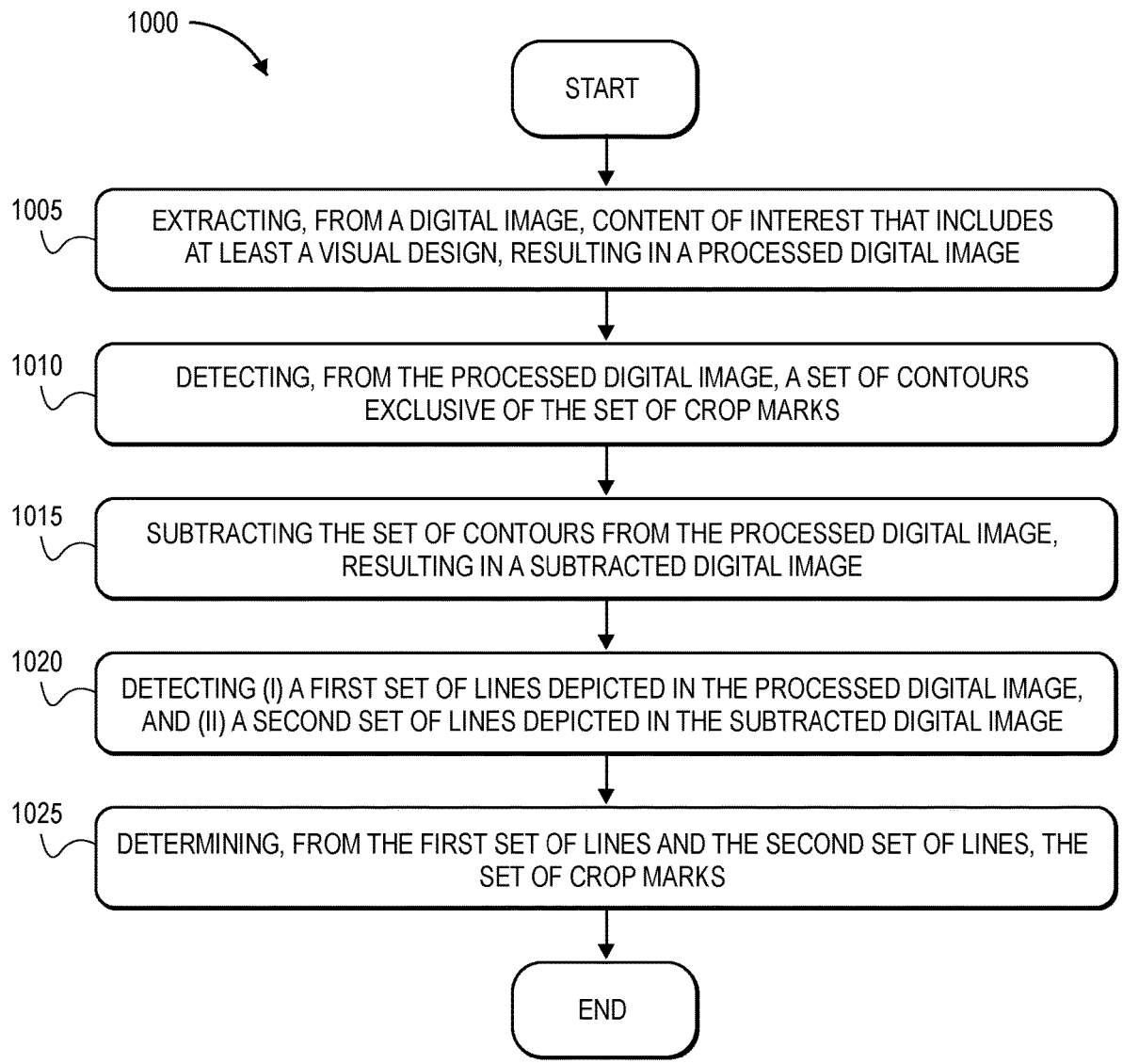
FIG. 10 depicts an example flow diagram associated with detecting a set of crop marks in a digital image, in accordance with some embodiments.

FIG. 10 depicts is a block diagram of an example method 1000 of detecting a set of crop marks in a digital image depicting a visual design. The method 1000 may be facilitated by an electronic device (such as either of the devices 103, 104, 105 as depicted in FIG. 1A) that may be in communication with a server (such as the central server 110 as discussed with respect to FIG. 1A). In embodiments, the method 1000 may be at least partially facilitated by a remote server, such as the central server 110 as discussed with respect to FIG. 1A.

The method 1000 may begin when the electronic device extracts (block 1005) content of interest that includes at least the visual design, resulting in a processed digital image. In particular, the electronic device may resize the digital image to a resized digital image, apply a greyscale to the resized digital image to generate a greyscale digital image, and remove, from the greyscale digital image, a set of boundary content at least partly around the visual content, resulting in the processed digital image.

At block 1010, the electronic device may detect, from the processed digital image, a set of contours exclusive of the set of crop marks. In particular, the electronic device may smooth the processed digital image with a set of Gaussian filters, dilate the processed digital image, and, after smoothing and dilating the processed digital image, detect, from the processed digital image, the set of contours exclusive of the set of crop marks.

At block 1015, the electronic device may subtract the set of contours from the processed digital image, resulting in a subtracted digital image. Further, at block 1020, the electronic device may detect (i) a first set of lines depicted in the processed digital image, and (ii) a second set of lines depicted in the subtracted digital image. In particular, the electronic device may detect (i) the first set of lines depicted in the processed digital image using a first threshold, and (ii) the second set of lines depicted in the subtracted digital image using a second threshold different from the first threshold.

At block 1025, the electronic device may determine, from the first set of lines and the second set of lines, the set of crop marks. According to embodiments, the electronic device may, for each of the processed digital image and the subtracted digital image: apply a Canny edge detection to detect a set of possible edges, convolve a Sobel filter to highlight, from the set of possible edges, a set of horizontal lines and a set of vertical lines, and apply a Hough transform to determine a set of coordinates for each of the set of horizontal lines and the set of vertical lines.

Additionally or alternatively, the electronic device may, from the first set of lines and the second set of lines, filter out (i) a set of angular lines, (ii) a set of long lines exceeding a threshold length, and (iii) a set of multicolored lines having multiple colors, wherein the set of crop marks remain after the filtering out. Additionally or alternatively, the electronic device may, from the first set of lines and the second set of lines, detect a set of line pairs, for each of the set of line pairs, calculate an intersection point, and filter out at least a portion of the set of line pairs based on the respective intersection point of each of the set of line pairs. According to embodiments, the electronic device may, for each of the set of line pairs, determine an intersection direction, and filter out at least a portion of the set of line pairs based on the respective intersection direction of each of the set of line pairs.

Additionally or alternatively, the electronic device may, from the first set of lines and the second set of lines, identify a set of duplicative intersecting lines each having at least two intersection points, for each of the set of duplicative intersecting lines, calculate a confidence score based on a set of geometric parameters, and filter out at least a portion of the set of duplicative intersecting lines based on the respective confidence score.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method of detecting a set of crop marks in a digital image depicting a visual design, the method comprising:
    extracting, by a computer processor from the digital image, content of interest that includes at least the visual design, resulting in a processed digital image;
    detecting, by the computer processor from the processed digital image, a set of contours exclusive of the set of crop marks;
    subtracting the set of contours from the processed digital image, resulting in a subtracted digital image;
    detecting, by the computer processor, (i) a first set of lines depicted in the processed digital image, and (ii) a second set of lines depicted in the subtracted digital image; and
    determining, from the first set of lines and the second set of lines, the set of crop marks.

2. The computer-implemented method of claim 1, wherein processing the digital image comprises:
    resizing the digital image to a resized digital image;
    applying a greyscale to the resized digital image to generate a greyscale digital image; and
    removing, from the greyscale digital image, a set of boundary content at least partly around the visual design, resulting in the processed digital image.

3. The computer-implemented method of claim 1, wherein detecting the set of contours exclusive of the set of crop marks comprises:
    processing the processed digital image, including:
        smoothing the processed digital image with a set of Gaussian filters, dilating the processed digital image, and
after smoothing and dilating the processed digital image, detecting, from the processed digital image, the set of contours exclusive of the set of crop marks.

4. The computer-implemented method of claim 1, wherein detecting the first set of lines and the second set of lines comprises:
detecting (i) the first set of lines depicted in the processed digital image using a first threshold, and (ii) the second set of lines depicted in the subtracted digital image using a second threshold different from the first threshold.

5. The computer-implemented method of claim 1, wherein determining, from the first set of lines and the second set of lines, the set of crop marks comprises:
for each of the processed digital image and the subtracted digital image:
applying an edge detection to detect a set of possible edges,
convolving a filter to highlight, from the set of possible edges, a set of horizontal lines and a set of vertical lines, and
applying a transform to determine a set of coordinates for each of the set of horizontal lines and the set of vertical lines.

6. The computer-implemented method of claim 1, wherein determining, from the first set of lines and the second set of lines, the set of crop marks comprises:
from the first set of lines and the second set of lines, filtering out (i) a set of angular lines, (ii) a set of long lines exceeding a threshold length, and (iii) a set of multicolored lines having multiple colors, wherein the set of crop marks remain after the filtering out.

7. The computer-implemented method of claim 1, wherein determining, from the first set of lines and the second set of lines, the set of crop marks comprises:
from the first set of lines and the second set of lines, detecting a set of line pairs;
for each of the set of line pairs, calculating an intersection point; and
filtering out at least a portion of the set of line pairs based on the respective intersection point of each of the set of line pairs.

8. The computer-implemented method of claim 7, further comprising:
for each of the set of line pairs, determining an intersection direction; and
filtering out at least a portion of the set of line pairs based on the respective intersection direction of each of the set of line pairs.

9. The computer-implemented method of claim 1, wherein determining, from the first set of lines and the second set of lines, the set of crop marks comprises:
from the first set of lines and the second set of lines, identifying a set of duplicative intersecting lines each having at least two intersection points;
for each of the set of duplicative intersecting lines, calculating a confidence score based on a set of geometric parameters; and
filtering out at least a portion of the set of duplicative intersecting lines based on the respective confidence score.

10. A system for detecting a set of crop marks in a digital image depicting a visual design, comprising:
a memory storing a set of computer-readable instructions; and
a processor interfacing with the memory, and configured to execute the set of computer-readable instructions to cause the processor to:
process the digital image to obtain a processed digital image that includes at least the visual design;
detect, from the processed digital image, a set of contours exclusive of the set of crop marks,
subtract the set of contours from the processed digital image, resulting in a subtracted digital image,
detect (i) a first set of lines depicted in the processed digital image, and (ii) a second set of lines depicted in the subtracted digital image, and
determine, from the first set of lines and the second set of lines, the set of crop marks.

11. The system of claim 10, wherein to to process the digital image, the processor is configured to:
resize the digital image to a resized digital image,
apply a greyscale to the resized digital image to generate a greyscale digital image, and
remove, from the greyscale digital image, a set of boundary content at least partly around the visual design, resulting in the processed digital image.

12. The system of claim 10, wherein to detect the set of contours exclusive of the set of crop marks, the processor is configured to:
process the processed digital image, including:
smooth the processed digital image with a set of Gaussian filters,
dilate the processed digital image, and
after smoothing and dilating the processed digital image, detect, from the processed digital image, the set of contours exclusive of the set of crop marks.

13. The system of claim 10, wherein to detect the first set of lines and the second set of lines, the processor is configured to:
detect (i) the first set of lines depicted in the processed digital image using a first threshold, and (ii) the second set of lines depicted in the subtracted digital image using a second threshold different from the first threshold.

14. The system of claim 10, wherein to determine, from the first set of lines and the second set of lines, the set of crop marks, the processor is configured to:
for each of the processed digital image and the subtracted digital image:
apply an edge detection to detect a set of possible edges,
convolve a filter to highlight, from the set of possible edges, a set of horizontal lines and a set of vertical lines, and
apply a transform to determine a set of coordinates for each of the set of horizontal lines and the set of vertical lines.

15. The system of claim 10, wherein to determine, from the first set of lines and the second set of lines, the set of crop marks, the processor is configured to:
from the first set of lines and the second set of lines, filter out (i) a set of angular lines, (ii) a set of long lines exceeding a threshold length, and (iii) a set of multicolored lines having multiple colors, wherein the set of crop marks remain after the filtering out.

16. The system of claim 10, wherein to determine, from the first set of lines and the second set of lines, the set of crop marks, the processor is configured to:
from the first set of lines and the second set of lines, detect a set of line pairs, for each of the set of line pairs, calculate an intersection point, and
filter out at least a portion of the set of line pairs based on the respective intersection point of each of the set of line pairs.

17. The system of claim 16, wherein the processor is further configured to:
for each of the set of line pairs, determine an intersection direction, and
filter out at least a portion of the set of line pairs based on the respective intersection direction of each of the set of line pairs.

18. The system of claim 10, wherein determining, from the first set of lines and the second set of lines, the set of crop marks comprises:
from the first set of lines and the second set of lines, identify a set of duplicative intersecting lines each having at least two intersection points,
for each of the set of duplicative intersecting lines, calculate a confidence score based on a set of geometric parameters, and
filter out at least a portion of the set of duplicative intersecting lines based on the respective confidence score.

19. A non-transitory computer-readable storage medium having stored thereon a set of instructions, executable by at least one processor, for detecting a set of crop marks in a digital image depicting a visual design, the instructions comprising:
Instructions for processing the digital image to obtain a processed digital image that includes at least the visual design;
instructions for detecting, from the processed digital image, a set of contours exclusive of the set of crop marks;
instructions for subtracting the set of contours from the processed digital image, resulting in a subtracted digital image;
instructions for detecting (i) a first set of lines depicted in the processed digital image, and (ii) a second set of lines depicted in the subtracted digital image; and
instructions for determining, from the first set of lines and the second set of lines, the set of crop marks.

20. The non-transitory computer-readable storage medium of claim 19, wherein the instructions further comprise:
instructions for, for each of the set of line pairs, determining an intersection direction; and
instructions for filtering out at least a portion of the set of line pairs based on the respective intersection direction of each of the set of line pairs.

* * * * *

UNITED STATES PATENT AND TRADEMARK OFFICE
CERTIFICATE OF CORRECTION

PATENT NO. : 11,145,064 B2  
APPLICATION NO. : 17/104581  
DATED : October 12, 2021  
INVENTOR(S) : Anshul Garg Page 1 of 1

It is certified that error appears in the above-identified patent and that said Letters Patent is hereby corrected as shown below:

In the Claims

At Column 14, Line 40-42, "extracting, by a computer processor from the digital image, content of interest that includes at least the visual design, resulting in a processed digital image;" should be -- processing, by a computer processor, the digital image to obtain a processed digital image that includes at least the visual design; --.

At Column 16, Line 5, "design;" should be -- design, --.

At Column 16, Line 15, "to to" should be -- to --.

At Column 18, Line 4, "Instructions" should be -- instructions --.

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*